United States Patent [19]

Pampouchidis et al.

[11] 4,367,319
[45] * Jan. 4, 1983

[54] AUTO-CROSSLINKING, CATHODICALLY DEPOSITABLE BINDERS

[75] Inventors: Georg Pampouchidis; Helmut Hönig, both of Graz, Austria

[73] Assignee: Vianova Kunstharz, A.G., Werndorf, Austria

[ * ] Notice: The portion of the term of this patent subsequent to Dec. 28, 1999, has been disclaimed.

[21] Appl. No.: 216,378

[22] Filed: Dec. 15, 1980

[30] Foreign Application Priority Data

Dec. 17, 1979 [AT] Austria ................................. 7909/79

[51] Int. Cl.³ ............................................ C08G 59/50
[52] U.S. Cl. ................................ 525/504; 204/181 C; 523/417; 525/507; 528/111; 528/113; 528/332; 528/407
[58] Field of Search ................. 260/29.2 EP, 29.2 TN; 525/507, 504; 528/111, 113, 332, 407; 204/181 C

[56] References Cited

U.S. PATENT DOCUMENTS

| | | | |
|---|---|---|---|
| 4,134,864 | 1/1979 | Belanger | 528/113 X |
| 4,147,676 | 4/1979 | Pampouchidis | 260/23 TN |
| 4,182,833 | 1/1980 | Micks | 528/120 |
| 4,278,580 | 7/1981 | Schmölzer et al. | 260/29.2 EP |

Primary Examiner—Earl A. Nielsen
Attorney, Agent, or Firm—A. W. Breiner

[57] ABSTRACT

Auto-crosslinking, cathodically depositable binders which are water-dilutable upon neutralization comprising the reaction product of:

(A) 2 moles of a polyepoxy compound with from 2 to 10 epoxy groups per molecule and an epoxy equivalent of from 100 to 1000;
(B) 0.1 to 2.0 moles of a diamine, the nitrogen atoms being secondary-secondary or primary-tertiary;
(C) from 1 to 10 moles of an alpha,beta-unsaturated monocarboxylic acid; and
(D) from 0.5 to 10 moles of dialkanol amine and/or of a monoalkanol monoalkyl amine, whereby the weight ratios of the components are chosen in order that the sum of the epoxy-reactive hydrogen atoms of components (B) through (D) substantially correspond to the number of epoxy groups of component (A), and the binder contains from 0.5 to 2.5 basic nitrogen atoms and from 0.5 to 2.5 polymerizable double bonds per 1000 molecular weight units. The binders upon heating do not decompose and when employed in coating compositions provide good electrochemical characteristics and good surface qualities.

27 Claims, No Drawings

AUTO-CROSSLINKING, CATHODICALLY DEPOSITABLE BINDERS

The present invention relates to paint binders. More particularly this invention is concerned with cathodically depositable binders for paints which can be deposited by the electrodeposition process.

U.S. Pat. No. 4,147,676 discloses a process for producing binders whereby 2 moles of a diepoxy resin are reacted with 1 mole of a primary-secondary or secondary-secondary diamine and 2 moles of a saturated and/or unsaturated monocarboxylic acid. In order to attain sufficient crosslinking, it is necessary in most cases to introduce the double bonds necessary for crosslinking by employing unsaturated isocyanate compounds. Under unfavorable stoving conditions, these isocyanate compounds can be split off, and, as a result, crosslinking sites are lost and stoving equipment is soiled with the decomposition products. Furthermore, it has shown that the binders disclosed in U.S. Pat. No. 4,147,676 do not have sufficient basicity for obtaining neutralization at optimum conditions, which, in turn, owing to a necessarily higher degree of neutralization for achieving dilutability with water, may lead to enhanced corrosion of the coating equipment.

Surprisingly, it has now been found that it is possible to avoid the disadvantages of the coating compositions obtained according to U.S. Pat. No. 4,147,676, and, in addition, to considerably improve other important properties, such as electrochemical characteristics, surface quality, and corrosion protection, by using a modified resin composition.

The present invention, therefore, describes auto-crosslinking, cathodically depositable paint binders and a process for the production of such binders based on amine-modified epoxy resins, characterized in that:

(A) 2 moles of a polyepoxy compound with from 2 to 10, preferably 2.5 to 5, epoxy groups per molecule and an epoxy equivalent of from 100 to 1000 are reacted with (B) 0.1 to 2.0, preferably from 0.2 to 1.0, moles of an aliphatic and/or cycloaliphatic and/or aromatic diamine, the nitrogen atoms of which are either secondary-secondary or primary-tertiary linkages, and (C) from 1 to 10, preferably from 2 to 5, moles of an alpha, beta-unsaturated monocarboxylic acid, optionally in admixture with subordinate quantities of saturated and/or unsaturated monocarboxylic acids with from 2 to 18 carbon atoms, and (D) from 0.5 to 10, preferably from 1 to 5, moles of a dialkanol amine and/or of a monoalkanol monoalkyl amine, optionally in admixture with dialkyl amines, and (E) the obtained product is rendered water-dilutable through partial or total neutralization with inorganic and/or organic acids, the weight ratios being chosen in order that the sum of epoxy-reactive hydrogen atoms of components (B) to (D) substantially correspond to the number of epoxy groups of component (A) and that the final product contains from 0.5 to 2.5 basic nitrogen atoms and from 0.5 to 2.5 polymerizable bonds per 1000 molecular weight units. The coating compositions produced based on the products of this invention provide, even with a low degree of neutralization, good dilutability with water, high basicity, low corrosion of the installations, high deposition equivalent, and low energy consumption, respectively. The compositions can be deposited at high voltage without surface defects and exhibit enhanced throwing power.

Suitable components (A) are polyepoxy compounds with from 2 to 10 epoxy groups per molecule and with an epoxy equivalent weight of from 100 to 1000. In this group the polyglycidyl ethers of phenol or cresol novolaks or their hydration products are the preferred compounds. Diepoxy compounds such as the diglycidyl ethers of Bisphenol A or glycidyl esters of aliphatic, aromatic, or cycloaliphatic polycarboxylic acids or polyols preferably are used in conjunction with higher functional epoxy resins.

Suitable diamines for use according to this invention having either one primary and one tertiary amine group or two secondary amine groups (component (B)) include 3-dimethylaminopropylamine, 3-diethylaminopropylamine, 4-dimethylaminobutylamine, 4-diethylaminobutylamine, 3-diethanolaminopropylamine, N,N-dimethylisophorone diamine, N,N-diethylisophorone diamine, N-(2-aminoethyl)-morpholine, N-(3-aminopropyl)-morpholine, N,N'-diethylpropylene diamine, N,N'-diethanolpropylene diamine, N,N'-diethylisophorone diamine, and N,N'-diethanolisophorone diamine.

Suitable unsaturated monocarboxylic acids (component (C)) are alpha,beta-unsaturated acids such as acrylic, methacrylic, or crotonic acid as well as semiesters of maleic acid or itaconic acid with saturated monoalcohols or semiesters of other aliphatic, cycloaliphatic, or aromatic dicarboxylic acids with alpha,beta-ethylenically unsaturated monoalcohols. For example, semiesters obtained through reaction of succinic acid anhydride, phthalic acid anhydride, tetra- or hexahydrophthalic anhydride with hydroxyalkyl methacrylates or esters of methacrylic acid with di-, tri-, or polyalkylene glycols can be used to advantage. Together with the above-mentioned alpha,beta-ethylenically unsaturated carboxylic acids, subordinate quantities of other unsaturated or saturated monocarboxylic acids with from 2 to 18 carbon atoms may be used, exemplified by acetic acid, n-capronic acid, isononanoic acid, palmitic acid, dehydrated castor oil fatty acid, oleic acid, and stearic acid.

Preferred suitable secondary amines (component (D)) are the dialkanol amines or monoalkanolmonoalkyl amines. Preferred components include diethanolamine, dipropanolamine, dibutanolamine, as well as methylmethanolamine, ethylethanolamine, propylethanolamine, methylpropanolamine, ethylpropanolamine, propylpropanolamine, or their homologues. Dialkyl amines, such as diethylamine, dipropylamine, or dibutylamine, may be coemployed.

Type and quantity of polyepoxy compound, diamine, unsaturated or saturated monocarboxylic acid, and secondary amine are chosen in order that, on the one hand, the number of epoxy reactive hydrogen atoms from the diamine, monocarboxylic acids, and secondary amines is practically equal to the number of epoxy groups in the reaction batch and, on the other hand, that after the addition reaction the product carries in 1000 molecular weight units from 0.5 to 2.5 of basic nitrogen groupings and from 0.5 to 2.5 polymerizable double bonds.

The process of the invention is preferably carried out in order that the polyepoxides are reacted at from 50° to 150° C. simultaneously with the diamines, secondary amines, and monocarboxylic acids while coemploying inert solvents and polymerization inhibitors. The preferred reaction temperature ranges between 100° and 120° C. Other choices of conditions can be selected, including without inert solvents, to obtain the essential reaction.

The amine groups of the coating composition according to the invention are neutralized partially or totally with organic and/or inorganic acids, including with formic acid, acetic acid, lactic acid, and phosphoric acid. The neutralized composition is then diluted with water. The degree of neutralization depends in the individual case upon the properties of the binder employed. The binder composition, with judicious selection of the components, permits dilution with or dispersion in water with a pH-value of from 5 to 8, and preferably from 6 to 7. The concentration of the binder in water depends upon the parameters utilized during application by electrodeposition and may range from 3 to 30% by weight, preferably 10 to 20% by weight. The composition which is applied may optionally contain various additives, such as pigments, extenders, paint surface active agents, and the like.

Upon deposition, the aqueous coating composition containing the binders of the invention is brought into contact with a wired anode and cathode, with the coating composition depositing on the surface of the cathode. A variety of electrically conductive substrates can be coated, especially metal substrates, such as steel, aluminum, copper, and the like, but also metallized substrates or other substrates covered with a conductive material can be used. After deposition, the coating is cured at elevated temperature. For curing, temperatures of from 130° to 200° C., preferably 150° to 180° C., are employed. Curing times are from 5 to 30 minutes, preferably 10 to 25 minutes.

The following examples illustrate the invention without limiting its scope. All parts and percentages given refer to parts or percentages by weight.

EXAMPLES 1–10

A reaction vessel is equipped with stirrer, addition funnel, thermometer, and reflux condensor. The polyepoxy compound and, if employed, an inert solvent are charged to the reaction vessel. The solvent, if used, can be ethyl glycol acetate. The monocarboxylic acid, the secondary amines and diamines are added and the blend is reacted for from 1 to 3 hours at from 100° to 110° C., coemploying a polymerization inhibitor, until the epoxy value and the acid value have fallen to practically 0. Quantity and type of the components are listed in Table 1.

TABLE 1

| | Polyepoxide (mole) | Diamine (mole) | Sec. Amine (mole) | Monocarboxylic Acid (mole) |
| --- | --- | --- | --- | --- |
| 1 | 2 EPH A | 0.7 DMAPA | 1.0 DÄOHA | 2.0 HE A |
| 2 | 2 EPH B | 0.7 DÄAPA | 1.6 DÄOHA | 4.2 MACS |
| 3 | 2 EPH B | 0.8 DÄAPA | 0.9 DÄOHA 0.9 DÄA | 3.8 HE B |
| 4 | 2 EPH B | 0.7 DÄAPA | 0.9 DÄOHA 0.9 DÄA | 3.6 HE B 0.4 RFS |
| 5 | 2 EPH B | 0.7 DÄAPA | 1.8 DIPA | 3.6 MACS 0.4 RFS |
| 6 | 2 EPH C | 0.6 DÄAPA | 2.0 DIPA | 4.0 MACS 1.0 RFS |
| 7 | 2 EPH C | 0.6 DMAPA | 2.0 DÄA | 4.0 MACS 1.0 RFS |
| 8 | 2 EPH C | 0.6 DMAPA | 1.0 DÄA 1.0 DÄOHA | 4.0 HEA 1.0 RFS |
| 9 | 1 EPH C 1 EPH D | 0.8 DMAPA | 1.5 DIPA | 3.0 HE B |
| 10 | 1 EPH C 1 EPH D | 0.7 DMAPA | 1.4 DÄOHA | 3.0 HE B 0.3 RFS |

Key To Table 1
EPH A: liquid epoxy novolak resin with an epoxy equivalent of about 180 and an epoxy functionality of 2.2
EPH B: highly viscous epoxy novolak resin with an epoxy equivalent of about 180 and an epoxy functionality of 3.6
EPH C: semi-solid epoxy novolak resin with an epoxy equivalent of about 210 and an epoxy functionality of 4.1
EPH D: liquid epoxy resin based on Bisphenol A with an epoxy equivalent of about 180 and an epoxy functionality of 2
DMAPA: 3-dimethylaminopropylamine
DÄAPA: 3-diethylaminopropylamine
DÄOHA: diethanolamine
DÄA: diethylamine
DIPA: diisopropanolamine
HE A: semiester of maleic anhydride and hydroxyethylmethacrylate
HE B: semiester of tetrahydrophthalic anhydride hydroxyethylmethacrylate
MACS: methacrylic acid
RFS: dehydrated castor oil fatty acid

EVALUATION OF THE BINDERS PREPARED IN EXAMPLES 1–10

100 g resin solids of each of the binder samples were mixed with the quantity of acid listed below and made up to 1000 g with deionized water while stirring. The 10% solutions were deposited on steel panels as the cathode. Deposition time in all cases was 60 seconds. The coated substrates were then rinsed with deionized water and cured at elevated temperature. Average film thickness of the cured films was from 13 to 17 μm. Conditions and evaluation results are listed in Table 2.

TABLE 2

| | Neutralization | | | Deposition | | Tests | | | |
| --- | --- | --- | --- | --- | --- | --- | --- | --- | --- |
| | Quantity[1] | Type[2] | pH[3] | Volt | Curing Min./°C. | Hardness (4) | Indentation (5) | Resistance (6) | (7) |
| 1 | 1.8 | A | 6.6 | 240 | 20/180 | 170 | 7.8 | 360 | 240 |
| 2 | 1.8 | A | 6.2 | 280 | 15/170 | 190 | 7.5 | 480 | 360 |
| 3 | 2.4 | E | 7.1 | 300 | 15/170 | 190 | 8.0 | 500 | 420 |
| 4 | 3.6 | M | 7.0 | 300 | 20/180 | 180 | 8.5 | 450 | 380 |
| 5 | 2.4 | E | 6.5 | 300 | 20/170 | 170 | 8.8 | 480 | 380 |
| 6 | 2.0 | A | 6.0 | 260 | 20/170 | 170 | 8.2 | 440 | 360 |
| 7 | 2.0 | A | 6.5 | 300 | 20/170 | 170 | 8.0 | 480 | 360 |
| 8 | 2.4 | E | 6.2 | 280 | 20/180 | 180 | 7.8 | 480 | 360 |
| 9 | 2.0 | A | 6.0 | 280 | 20/180 | 180 | 8.0 | 450 | 350 |

TABLE 2-continued

| Neutralization | | | Deposition | | Tests | | | |
|---|---|---|---|---|---|---|---|---|
| | | | | | Hardness | Indentation | Resistance | |
| Quantity[1] | Type[2] | pH[3] | Volt | Curing Min./°C. | (4) | (5) | (6) | (7) |
| 10 | 1.8 | A | 6.0 | 260 | 20/180 | 170 | 8.5 | 440 | 320 |

[1]quantity of acid in g added to 100 g of resin solids
[2]E = acetic acid; M = lactic acid; A = formic acid
[3]measured on a 10% aqueous solution
[4]Konig pendulum hardness DIN 53 157 (sec)
[5]Erichsen indentation DIN 53 156 (mm)
[6]hours of water soak at 40° C. until corrosion or blistering become visible
[7]salt spray ASTM B-117-64; 2mm of corrosion at the cross incision after the stated hours For the evaluation, degreased, non-pretreated steel panels were coated with a pigmented paint composed of 100 parts by weight of resin solids, 20 parts by weight of aluminum silicate pigment, and 2 parts by weight of carbon black.

As will be apparent to one skilled in the art, various modifications can be made within the scope of the aforesaid description. Such modifications being within the ability of one skilled in the art form a part of the present invention and are embraced by the appended claims.

It is claimed:

1. Auto-crosslinking, cathodically depositable binders comprising the reaction product of:
   (A) 2 moles of a polyepoxy compound with from 2 to 10 epoxy groups per molecule and an epoxy equivalent of from 100 to 1000;
   (B) 0.1 to 2.0 moles of an aliphatic and/or cycloaliphatic and/or aromatic diamine, the nitrogen atoms of which are secondary-secondary or primary-tertiary;
   (C) from 0 to 10 moles of an alpha,beta-unsaturated monocarboxylic acid, and
   (D) from 0.5 to 10 moles of a secondary amine, the weight ratios of said components being chosen whereby the said binders have an amine value sufficient to render said binders water dilutable upon neutralization with an inorganic or organic acid, and said binders being thermally self-crosslinking.

2. The binders of claim 1 wherein the polyepoxy compound of (A) is an epoxidized novolak resin.

3. The binders of claim 1 wherein the polyepoxy compound of component (A) has from about 2.5 to 5 epoxy groups per molecule.

4. The binders of claim 1 wherein the diamine of component (B) is present at from about 0.2 to 1.0 moles.

5. The binders of claim 1 wherein the monocarboxylic acid of component (C) is present at from about 2 to 5 moles, and said component (C) includes minor quantities of a saturated or unsaturated monocarboxylic acid having from 2 to 18 carbon atoms.

6. The binders of claim 1 wherein the secondary amine of component (D) is present at from about 1 to 5 moles of the dialkanol amine and/or monoalkanol monoalkyl amine, and the said component (D) includes minor amounts of dialkyl amines.

7. A water-dilutable, neutralized, auto-crosslinking, cathodically depositable paint binder comprising the reaction product of:
   (A) 2 moles of a polyepoxy compound with from 2 to 10 epoxy groups per molecule and an epoxy equivalent of from 100 to 1000;
   (B) 0.1 to 2.0 moles of an aliphatic and/or cycloaliphatic and/or aromatic diamine, the nitrogen atoms of which are secondary-secondary and primary-tertiary;
   (C) from 0 to 10 moles of an alpha,beta-unsaturated monocarboxylic acid, and
   (D) from 0.5 to 10 moles of a secondary amine,
   the weight ratios of said components being chosen whereby the said binders have an amine value sufficient to render said binders water dilutable upon neutralization with an inorganic or organic acid, and said binders being thermally self-crosslinking.

8. The neutralized binder of claim 7 wherein the polyepoxy compound of (A) is an epoxidized novolak resin.

9. The neutralized binder of claim 7 wherein the polyepoxy compound of component (A) has from about 2.5 to 5 epoxy groups per molecule.

10. The neutralized binder of claim 7 wherein the diamine of component (B) is present at from about 0.2 to 1.0 moles.

11. The neutralized binder of claim 7 wherein the monocarboxylic acid of component (C) is present at from about 2 to 5 moles, and said component (C) includes minor quantities of a saturated or unsaturated monocarboxylic acid having from 2 to 18 carbon atoms.

12. The neutralized binder of claim 7 wherein the secondary amine of component (D) is present at from about 1 to 5 moles of the dialkanol amine and/or monoalkanol monoalkyl amine, and the said component (D) includes minor amounts of dialkyl amines.

13. Process for the production of auto-crosslinking, cathodically depositable binders, characterized in that:
   (A) 2 moles of a polyepoxy compound with from 2 to 10 epoxy groups per molecule and an epoxy equivalent of from 100 to 1000 are reacted with
   (B) 0.1 to 2.0 moles of an aliphatic and/or cycloaliphatic and/or aromatic diamine, the nitrogen atoms of which are secondary-secondary or primary-tertiary ones, and
   (C) from 0 to 10 moles of an alpha,beta-unsaturated monocarboxylic acid, and
   (D) from 0.5 to 10 moles of a secondary amine, and
   (E) the product of (A)-(D) is rendered water-dilutable through partial or total neutralization with inorganic and/or organic acids,
   the weight ratios of said components being chosen whereby the said binders have an amine value sufficient to render said binders water dilutable upon neutralization with an inorganic or organic acid, and said binders being thermally self-crosslinking.

14. Process according to claim 13, characterized in that the polyepoxy compound is an epoxidized novolak resin.

15. The process of claim 13 wherein the polyepoxy compound has from about 2.5 to 5 epoxy groups per molecule.

16. The process of claim 13 wherein the diamine of component (B) is present at from 0.2 to 1.0 moles.

17. The process of claim 13 wherein the monocarboxylic acid of component (C) is present at from about 2 to 5 moles, and said component (C) includes minor quantities of a saturated or unsaturated monocarboxylic acid having from 2 to 18 carbon atoms.

18. The process of claim 13 wherein the secondary amine of component (D) is present at from about 1 to 5 moles of the dialkanol amine and/or monoalkanol monoalkyl amine, and the said component (D) includes minor amounts of dialkyl amines.

19. The process of claim 13 wherein said process is carried out in the presence of an inert solvent.

20. The process of claim 19 wherein component (A) is simultaneously reacted with components (B)-(D) at a temperature of from about 50° to 150° C.

21. The process of claim 20 wherein said temperature is between about 100° and 120° C.

22. The binders of claim 1 wherein said ratios of said components are chosen whereby the sum of epoxy-reactive hydrogen atoms of components (B) to (D) substantially correspond to the number of epoxy groups of component (A), and whereby the said product contains from 0.5 to 2.5 basic nitrogen atoms and from 0.5 to 2.5 polymerizable double bonds per 1000 molecular weight units.

23. The binders of claim 1 wherein said component (A) is a diepoxide, said component (B) is present in an amount of 1 mole, said component (C) is present in an amount of 0 to 1 moles, and said component (D) is present in an amount of from 1 to 2 moles.

24. The neutralized binder of claim 7 wherein said ratios of said components are chosen whereby the sum of epoxy-reactive hydrogen atoms of components (B) to (D) substantially correspond to the number of epoxy groups of component (A), and whereby the said product contains from 0.5 to 2.5 basic nitrogen atoms and from 0.5 to 2.5 polymerizable double bonds per 1000 molecular weight units.

25. The neutralized binder of claim 7 wherein said component (A) is a diepoxide, said component (B) is present in an amount of 1 mole, said component (C) is present in an amount of 0 to 1 moles, and said component (D) is present in an amount of from 1 to 2 moles.

26. The process of claim 13 wherein said ratios of said components are chosen whereby the sum of epoxy-reactive hydrogen atoms of components (B) to (D) substantially correspond to the number of epoxy groups of component (A), and whereby the said product contains from 0.5 to 2.5 basic nitrogen atoms and from 0.5 to 2.5 polymerizable double bonds per 1000 molecular weight units.

27. The process of claim 13 wherein said component (A) is a diepoxide, said component (B) is present in an amount of 1 mole, said component (C) is present in an amount of 0 to 1 moles, and said component (D) is present in an amount of from 1 to 2 moles.

* * * * *